United States Patent
Cho et al.

(10) Patent No.: US 11,186,227 B2
(45) Date of Patent: Nov. 30, 2021

(54) STORAGE DEVICE FOR VEHICLES

(71) Applicants: HYUNDAI MOTOR COMPANY, Seoul (KR); KIA MOTORS CORPORATION, Seoul (KR); DAEJOO PRECISION INDUSTRIAL, Hwaseong-si (KR)

(72) Inventors: Min Ho Cho, Suwon-si (KR); Jang Hyun Cho, Seongnam-si (KR); Dae Ig Jung, Suwon-si (KR); Jin Ho Hwang, Seoul (KR); Seung Hyeok Chang, Suwon-si (KR); Ki Young An, Hwaseong-si (KR)

(73) Assignees: HYUNDAI MOTOR COMPANY, Seoul (KR); KIA MOTORS CORPORATION, Seoul (KR); DAEJOO PRECISION INDUSTRIAL, Hwaseong-si (KR)

( * ) Notice: Subject to any disclaimer, the term of this patent is extended or adjusted under 35 U.S.C. 154(b) by 280 days.

(21) Appl. No.: 16/352,193

(22) Filed: Mar. 13, 2019

(65) Prior Publication Data

US 2020/0130587 A1     Apr. 30, 2020

(30) Foreign Application Priority Data

Oct. 30, 2018   (KR) .................. 10-2018-0130579

(51) Int. Cl.
   *B60R 7/02*     (2006.01)
   *B60R 5/04*     (2006.01)

(52) U.S. Cl.
   CPC . *B60R 7/02* (2013.01); *B60R 5/04* (2013.01)

(58) Field of Classification Search
   CPC .................................. B60R 7/02; B60R 5/04
   USPC ............ 296/37.1, 37.6, 37.12; 312/246, 245, 312/322, 323, 330.1, 334.1, 344.7, 334.8, 312/334.12, 334.7; 224/400, 281, 282, 224/484, 321, 324, 326, 327, 328
   See application file for complete search history.

(56) References Cited

U.S. PATENT DOCUMENTS

| | | | | |
|---|---|---|---|---|
| 4,676,544 A | * | 6/1987 | Dabringhaus | B60N 3/083 131/231 |
| 5,887,930 A | * | 3/1999 | Klein | B62D 25/12 296/37.12 |
| 6,050,628 A | * | 4/2000 | Allison | B60R 7/06 224/281 |
| 6,073,984 A | * | 6/2000 | Chaloult | B60R 7/02 296/37.13 |

(Continued)

FOREIGN PATENT DOCUMENTS

| | | | | | |
|---|---|---|---|---|---|
| FR | 2876329 A1 | * | 4/2006 | ............... | B60R 7/02 |
| JP | 58063540 A | * | 4/1983 | ............... | B60R 7/02 |

(Continued)

*Primary Examiner* — Hilary L Gutman
(74) *Attorney, Agent, or Firm* — Lempia Summerfield Katz LLC

(57) ABSTRACT

A storage device for vehicles enables a luggage box to be separated from a luggage compartment in a vehicle and to also be used outside the vehicle, thereby improving convenience in use. The storage device enables the internal space in the luggage compartment to be employed as a storage space even when the luggage box is separated from the luggage compartment, thereby improving availability of space.

13 Claims, 13 Drawing Sheets

(56) References Cited

U.S. PATENT DOCUMENTS

| | | | | |
|---|---|---|---|---|
| 6,135,529 A * | 10/2000 | De Angelis | ............... | B60R 7/04 |
| | | | | 296/37.8 |
| 6,213,533 B1 * | 4/2001 | Widulle | .................... | B60R 7/06 |
| | | | | 224/282 |
| 2011/0169292 A1 * | 7/2011 | Gayon | ...................... | B60R 7/06 |
| | | | | 296/37.12 |
| 2015/0375687 A1 * | 12/2015 | Gillam | ...................... | B60R 9/02 |
| | | | | 296/37.1 |
| 2019/0092245 A1 * | 3/2019 | Makino | ..................... | B60R 7/02 |
| 2020/0290517 A1 * | 9/2020 | Sabdad | ................... | B60R 11/00 |
| 2020/0324705 A1 * | 10/2020 | Lee | ........................... | B60R 7/02 |
| 2020/0324706 A1 * | 10/2020 | Cho | .......................... | B60R 7/04 |

FOREIGN PATENT DOCUMENTS

| | | | | | |
|---|---|---|---|---|---|
| JP | 09086287 A | * | 3/1997 | ............... | B60R 7/02 |
| JP | 2012030661 A | * | 2/2012 | ............... | B60R 5/04 |
| KR | 20030008913 A | * | 1/2003 | | |
| KR | 1020170042993 | | 4/2017 | | |

* cited by examiner

STORAGE DEVICE FOR VEHICLES

CROSS-REFERENCE TO RELATED APPLICATION

This application claims priority to and the benefit of Korean Patent Application No. 10-2018-0130579, filed on Oct. 30, 2018, in the Korean Intellectual Property Office, the disclosure of which is incorporated herein by reference.

BACKGROUND

1. Technical Field

The present disclosure relates to a storage device for vehicles, which provides the inside of a luggage compartment with a storage space for accommodating luggage and enables a luggage box to be removed from the luggage compartment to be used outside a vehicle.

2. Description of the Related Art

A vehicle is generally provided with a luggage compartment, which serves as a space for accommodating objects. The luggage compartment is provided at the rear side of a vehicle and is variously embodied depending on the kind of vehicle. In consideration of design trends and user convenience, the internal space of a trunk may be designed to be larger.

Because a vehicle always carries objects, such as cleaning items required for maintenance of a vehicle and safety products, the recent trend is to provide additional spaces required to separately accommodate objects of small size. In recent years, in order to secure additional storage space in the luggage compartment, useless spaces at lateral sides of the luggage compartment have come to be utilized.

In order to utilize such useless spaces, a conventional solution is to simply provide a luggage compartment with a tray body and a partition wall, such as a net wall, to prevent luggage from being removed from the luggage compartment. Hence, the useless space is not efficiently utilized. In addition, because a luggage box is fixedly provided in the luggage compartment, it is impossible to use the luggage box outside the vehicle.

In other words, when there is a need to move certain luggage in a luggage compartment to the outside, the luggage has to be individually taken out of the luggage compartment and moved to the outside, which is inconvenient.

The information disclosed in this Background section is only to enhance understanding of the general background of the disclosure and should not be taken as an acknowledgement or any form of suggestion that this information forms the prior art already known to a person of ordinary skill in the art.

SUMMARY

Therefore, the present disclosure is made in view of the above problems. An object of the present disclosure is to provide a storage device for vehicles, which enables a luggage box to be separated from a luggage compartment in a vehicle and to also be used outside the vehicle, thereby improving convenience in use, and which enables the internal space in the luggage compartment to be employed as a storage space when the luggage box is separated from the luggage compartment, thereby improving availability of space.

In accordance with the present disclosure, the above and other objects can be accomplished by the provision of a storage device for vehicles. The storage device includes a luggage housing defining a storage space at a lateral side of a luggage compartment. The storage device has an open surface, a luggage box removably received in the storage space in the luggage housing and having an internal space, and guide units provided at the luggage housing so as to be slid toward the open surface and then to be tilted to a predetermined angle. The luggage box is removably mounted on the guide units.

The luggage housing may include guide rails provided at front and rear surfaces thereof, which are positioned at two lateral sides of the open surface and extend toward the open surface. The guide units may be slidably mounted on the guide rails.

Each of the guide rails may extend toward the open surface from the inside of the luggage housing and may be bent downwards at an outer end thereof.

Each of the guide units may include a mounting unit, which is provided at an inner surface of the luggage housing to be slid along a corresponding one of the guide rails. The luggage box may be removably mounted on the mounting unit. A driving unit, which is provided at an outer surface of the luggage housing to be coupled to the mounting unit, is elastically movable toward the open surface along the guide rail.

The luggage box may include mounting protrusions provided at front and rear surfaces thereof. The mounting unit may extend vertically and may include mounting grooves that extend longitudinally. The mounting protrusions may be respectively fitted into the mounting grooves.

Each of the guide rails may include a plurality of guide rails, which are arranged vertically. Each of the mounting units may include a guide portion, which is mounted on one of the plurality of guide rails and is moved therealong, and an extending portion coupled to the driving unit through another guide rail.

The plurality of guide rails may include a first guide hole positioned at an uppermost level, a second guide hole positioned at an intermediate level, and a third guide hole positioned at a lowermost level, all of which are spaced apart from one another. The guide portion of the mounting unit may be mounted in the second guide hole. The extending portion may include a plurality of extending portions, which are coupled to the driving unit respectively through the first guide hole and the third guide hole.

The guide portion may be rotatably mounted on the mounting portion and may have a threaded portion therearound. The one of the plurality of guide rails, on which the guide portion is mounted, may include a threaded portion, which corresponds to the threaded portion of the guide portion.

The driving unit may include a movable portion positioned on an outer surface of the luggage housing, to which the mounting unit is coupled, and an elastic portion, which is secured to the luggage housing and is connected to the movable portion to provide elastic force to move the movable portion toward the open surface.

The elastic portion may be a spiral spring secured to the luggage housing adjacent to the open surface. The movable portion, which extends vertically, may be provided with the mounting unit coupled to an inner surface thereof and may be provided on an outer surface thereof with a coupling portion. The spiral spring may be connected to the coupling portion.

The luggage housing may further include a detachable cover, which is removably mounted on one of the guide units to shield part of the open surface after the luggage box is removed from the luggage housing.

The detachable cover may be provided at an upper end thereof with a first coupler, which is detachably coupled to the guide units, and may be provided at a lower end thereof with a second coupler, which is detachably coupled to a lower portion of the luggage housing.

The luggage housing may further include a rotatable cover, which is positioned at the open surface and is rotatably coupled to a bottom surface of the luggage housing to shield part of the open surface. The rotatable cover may be provided at a rotational center thereof with a torsion spring to provide the rotatable cover with elastic force required to close the open surface.

The rotatable cover may be provided at a lower end thereof, serving as a rotational center, with a stop portion that comes into contact with the luggage housing when the rotatable cover is rotated to a predetermined angle in a direction of closing the open surface, thereby stopping the rotational movement of the rotatable cover.

The luggage housing may further include rotatable walls, which are respectively provided at front and rear surfaces of the luggage housing that are positioned at two lateral sides of the open surface. The rotatable walls may be rotatable from the front and rear surfaces toward the open surface to shield the open surface.

The rotatable walls may include a front rotatable wall, a rotational center of which is positioned at a front surface of the luggage housing, and a rear rotatable wall, the rotational center of which is positioned at a rear surface of the luggage housing. The front rotatable wall and the rear rotatable wall may be configured such that ends thereof that face each other overlap each other when the front rotatable wall and the rear rotatable wall are rotated in a direction of closing the open surface.

The ends of the front rotatable wall and the rear rotatable wall that overlap each other may include magnetic members, which have different polarities, embedded therein.

The storage device may further include a carrier box, which is removably inserted into the internal space in the luggage box. The luggage box may be provided on an inner and lower surface thereof with a pusher, which functions to resiliently support the carrier box upwards through pushing manipulation thereof.

The luggage housing may further include vertical protrusions or horizontal protrusions provided on an inner surface thereof and a partition, which is supported by the vertical protrusions or is placed on the horizontal protrusions.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION

Hereinafter, a storage device for vehicles according to an embodiment of the present disclosure is described with reference to the accompanying drawings.

Figure 1:
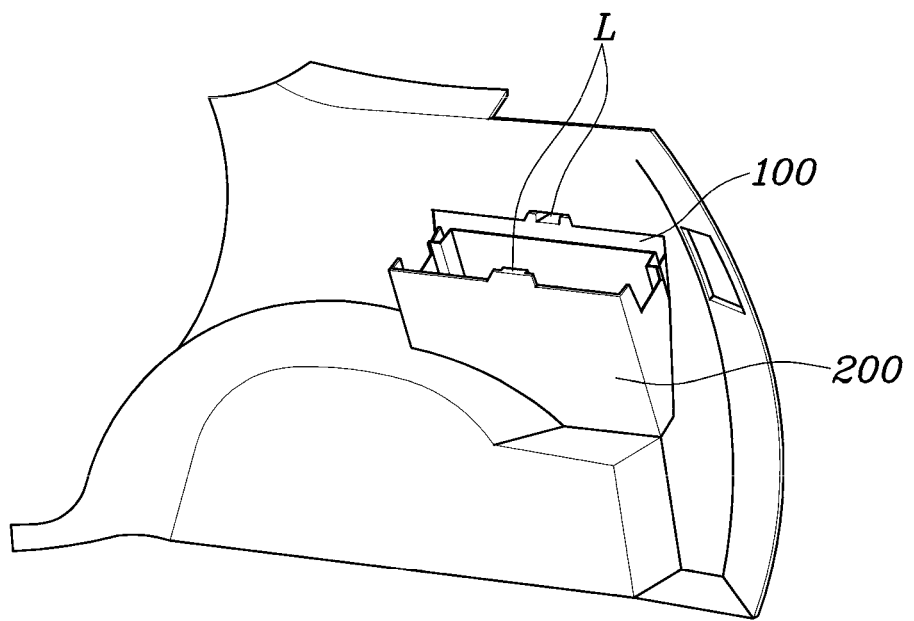
FIGS. 1 and 2 are views illustrating a storage device for vehicles according to an embodiment of the present disclosure.
Figure 2:
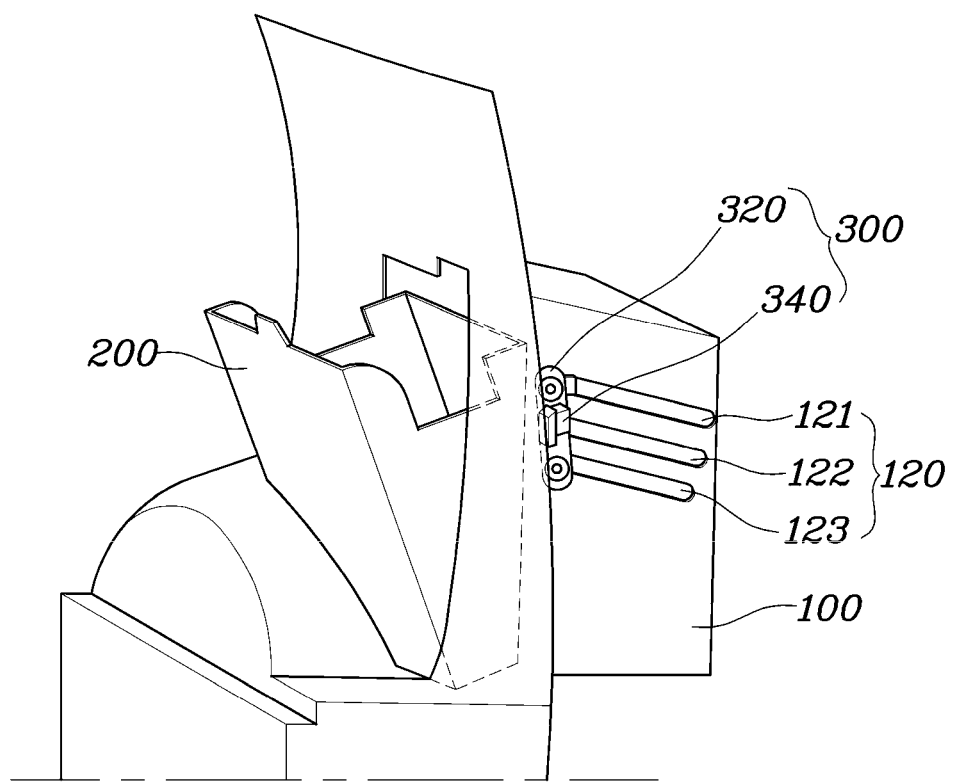

FIGS. 1 and 2 are views illustrating the storage device for vehicles according to an embodiment of the present disclosure. FIGS. 3-13 are views illustrating the storage device for vehicles illustrated in FIG. 1.

Figure 3:
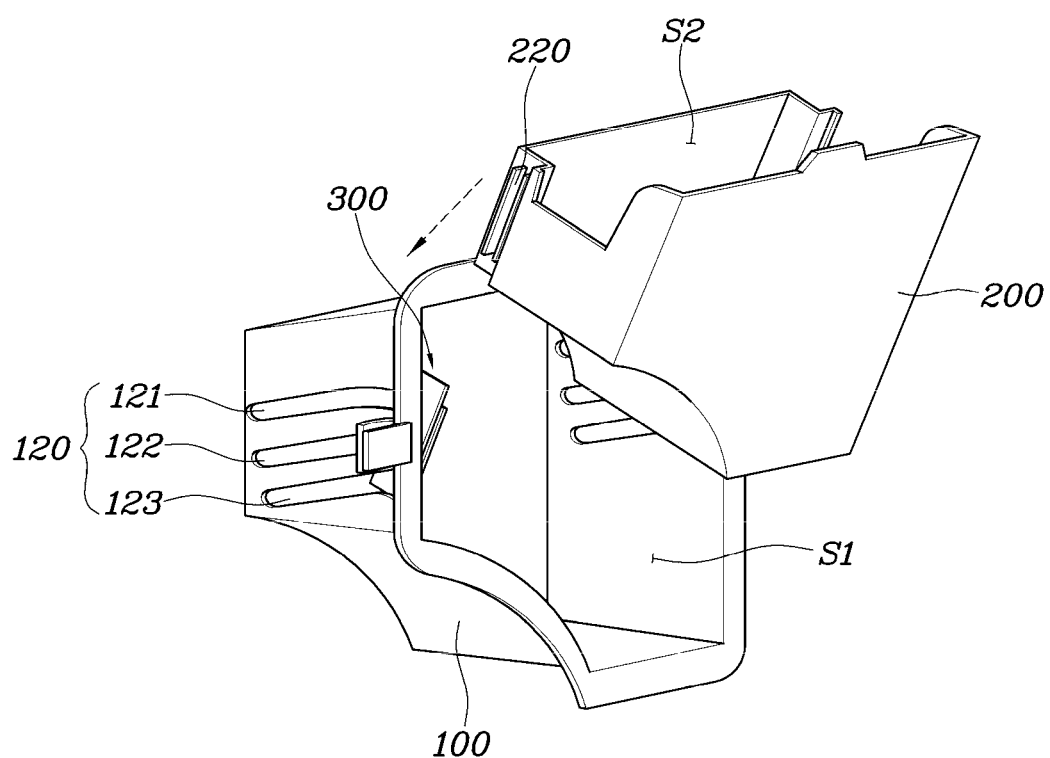
FIGS. 3-13 are views illustrating the storage device for vehicles illustrated in FIG. 1.
Figure 8:
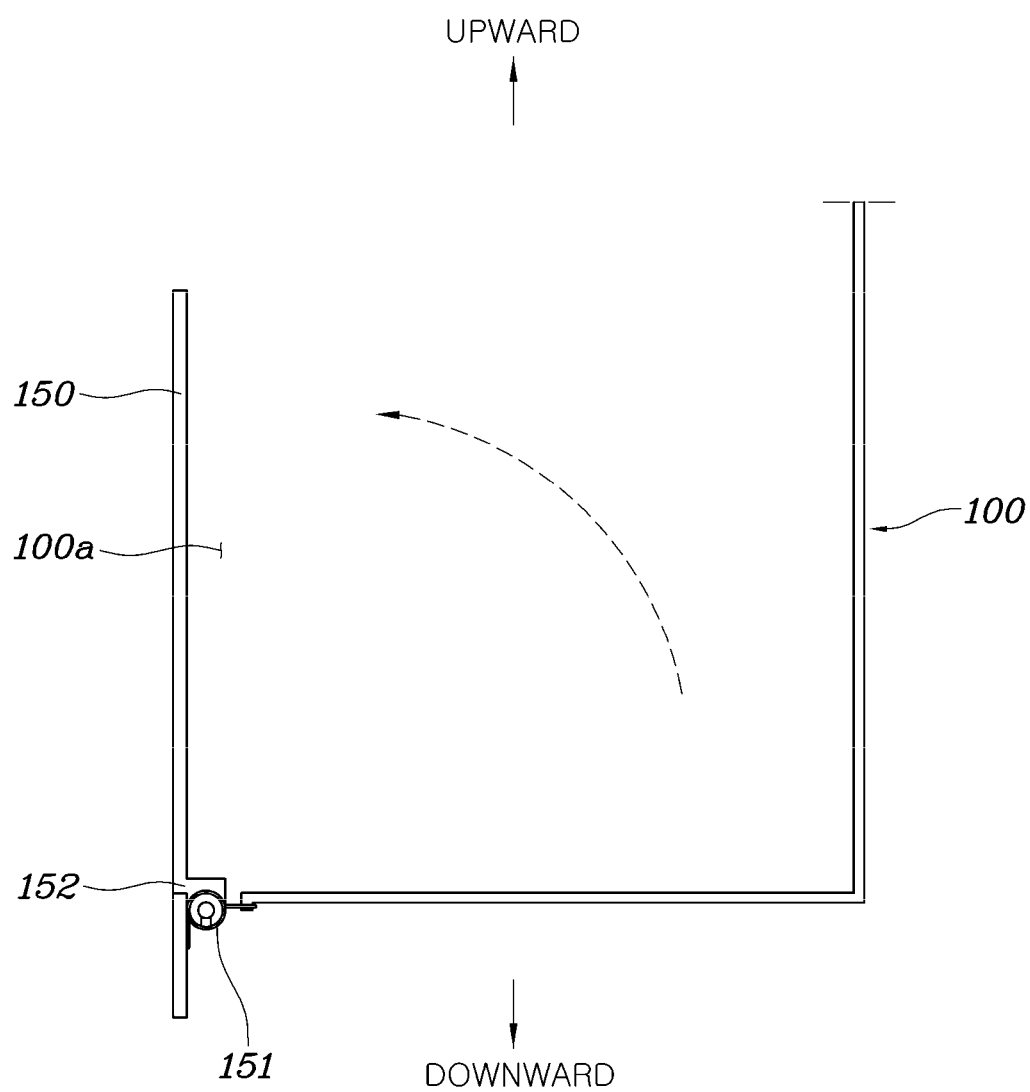
Figure 10:
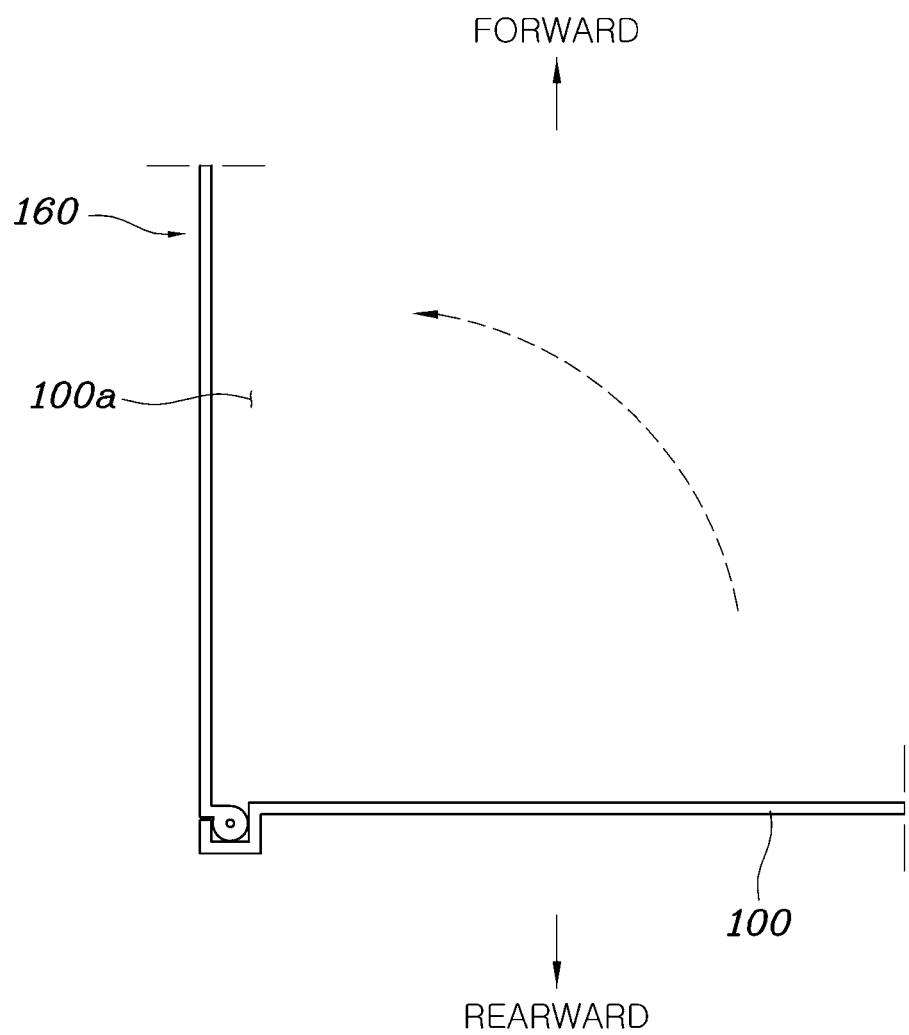

As shown in FIGS. 1-3, the storage device for vehicles according to the present disclosure includes a luggage housing 100. The luggage housing 100 defines a storage space S1 at a lateral side of a luggage compartment and has an open surface 100a, as shown in FIGS. 8 and 10, that is open toward the luggage compartment. The luggage housing 100 has a luggage box 200, which is configured to be removably received in the storage space S1 of the luggage housing 100 and has an internal space S2. The luggage housing 100 has guide units 300, which are adapted to be slid toward the open surface 100a from the luggage housing 100 and then to be tilted to a predetermined tilting angle, and to which the luggage box 200 is removably mounted. The luggage box 200 may have a hook or push-up coupling structure, which enables the luggage box 200 to be locked to or released from the luggage housing 100. The locking structure L, which is provided at the luggage housing 100 and the luggage box 200, may be any locking structures that are typically used in the art.

In this manner, the storage device according to the present disclosure includes the luggage housing 100, which is provided at the lateral side of the luggage compartment, and the luggage box 200, which is constructed to be received in and taken out of the luggage housing 100 by virtue of the guide units 300. Here, the luggage box 200 is configured to be rotated during withdrawal from the luggage housing 100. The luggage housing 100 may be integrally formed with the lateral side of the luggage compartment. The luggage housing 100 may be fixedly secured to the luggage compartment and may define the storage space S1 for receiving luggage therein. The luggage box 200 may be configured to correspond to the shape of the storage space S1 of the luggage housing 100 to be received in the storage space S1. The internal space S2 of the luggage box 200 is constructed to receive luggage in place of the storage space S1 in the luggage housing 100 when the luggage box 200 is received in the luggage housing 100.

In particular, the luggage box 200 according to the embodiment of the present disclosure may be removably mounted on the guide units 300. The guide units 300 are constructed to be slid toward the open surface 100a of the luggage housing 100 and then to be tilted to a predetermined angle. Consequently, when the luggage box 200 is taken out of the luggage housing 100, the luggage box 200 may be drawn toward the open surface 100a of the luggage housing 100 and may be tilted to allow luggage to be easily received in the internal space S2 of the luggage box 200. Furthermore, when the luggage box 200 is drawn outwards, the luggage box 200 may be removed from the guide units 300 to also be used outside the vehicle.

In this way, the storage device according to the embodiment of the present disclosure enables the luggage box 200 to be drawn outward from the luggage housing 100 in the luggage compartment to allow luggage to be received in the internal space S2 in the luggage box 200. In addition, the availability of the storage space S1 is improved since the luggage housing 100, from which the luggage box 200 has been removed, is able to receive luggage in the storage space S1.

Figure 4:
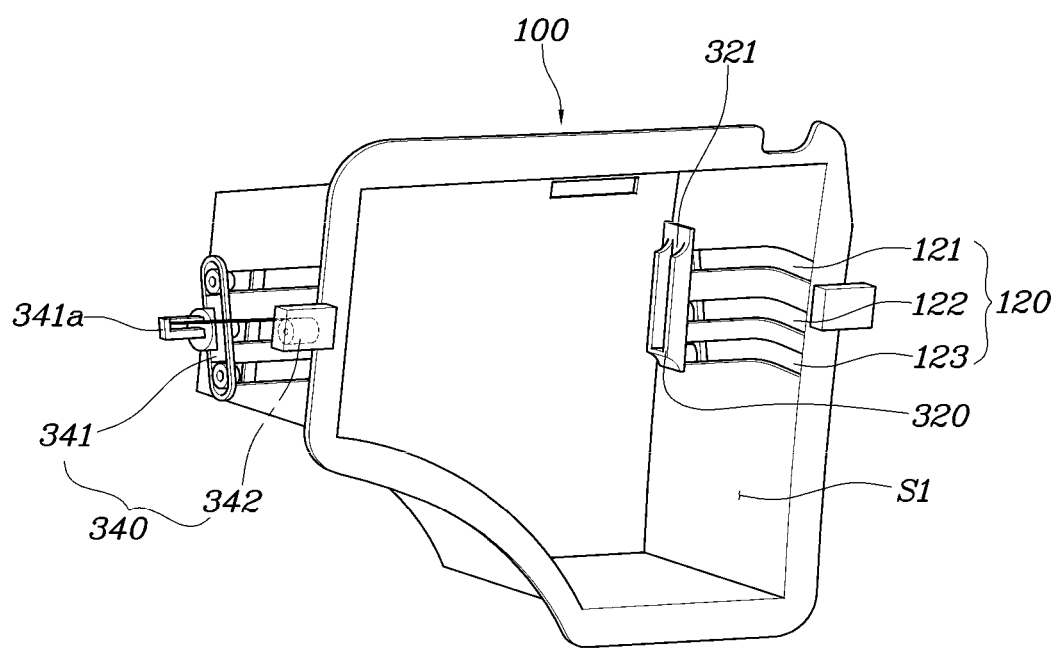
Figure 5:
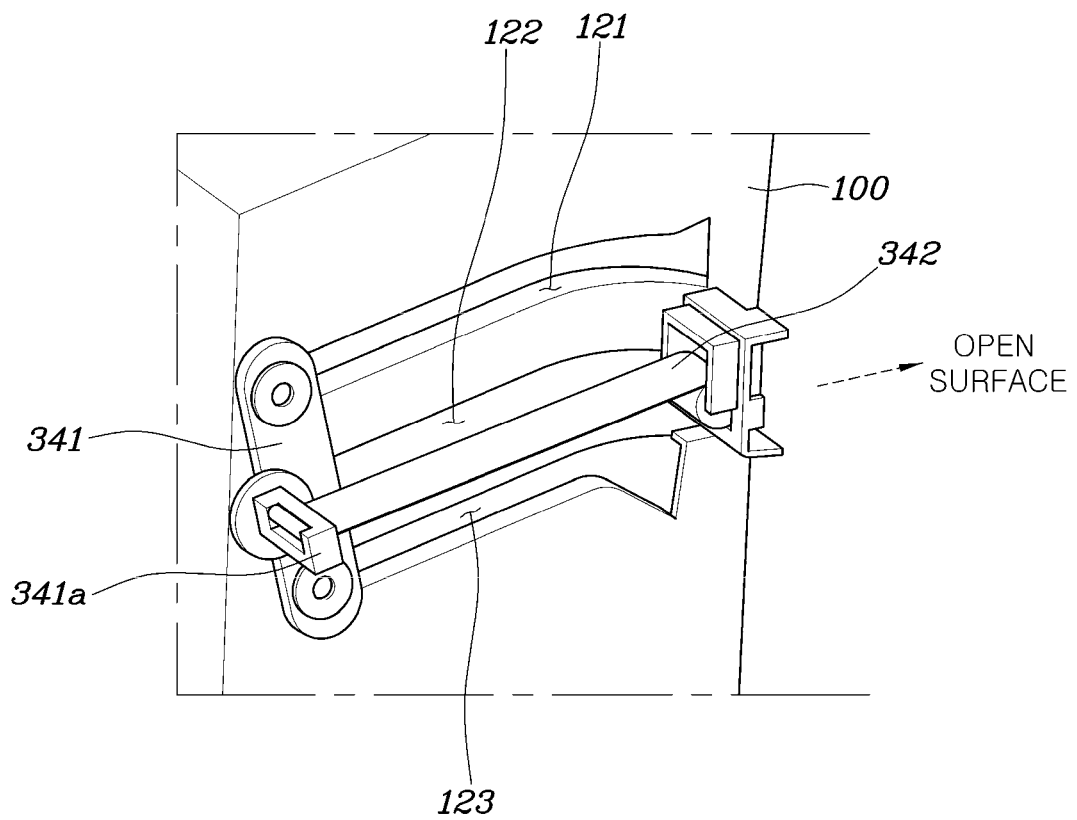

More specifically, as illustrated in FIGS. 4 and 5, the luggage housing 100 according to the embodiment of the present disclosure may include guide rails 120, which are provided at the front and rear surface that are positioned at two lateral sides of the open surface 100a and which extend toward the open surface 100a. The guide units 300 are slidably mounted on the guide rails 120. Here, the front and rear surfaces of the luggage housing 100 are not set based on the anteroposterior direction of the vehicle and may be the two lateral side surfaces of the luggage housing 100 based on the open surface 100a.

In this way, since the guide rails 120 are provided at the front and rear surfaces of the luggage housing 100 to extend toward the open surface 100a and the guide units 300 are movable along the guide rails 120, the luggage box 200 mounted on the guide units 300 may be taken out of or received in the open surface 100a of the luggage housing 100.

The guide rails 120 may be configured to extend linearly toward the open surface 100a from the inside of the luggage housing 100 and may be bent downwards at the outer ends thereof. As shown in FIGS. 4 and 5, the guide units 300 are tilted along the bent portions of the guide rails 120 since the outer ends of the guide rails 120 are bent downwards, thereby allowing the luggage box 200 mounted on the guide units 300 to be completely taken out of the luggage housing 100. Consequently, the internal space S2 in the luggage box 200 may be completely exposed from the luggage housing 100 and may be smoothly separated from the guide units 300 without interfering with the luggage housing 100.

Figure 6:
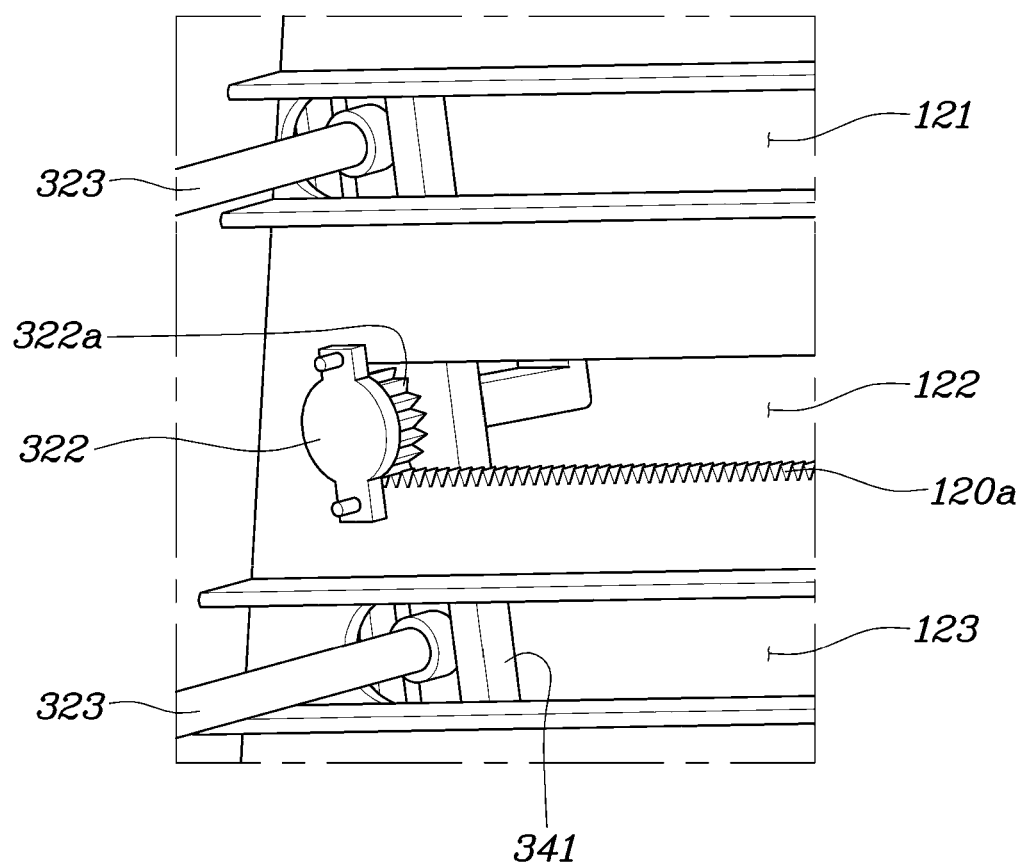

The guide units 300, which are adapted to allow withdrawal of the luggage box 200, are described in detail hereinbelow. As shown in FIGS. 2, 4, and 6, each of the guide units 300 may include a mounting unit 320, which is moved along the guide rail 120 on the inner surface of the luggage housing 100 and to which the luggage box 200 is removably mounted, and a driving unit 340, which is provided at the outer surface of the luggage housing 100 to be coupled to the mounting unit 320 and is elastically movable along the guide rail 120 toward the open surface 100a.

In this way, each of the guide units 300 is composed of the mounting unit 320 and the driving unit 340. The mounting unit 320 and the driving unit 340 are coupled to each other and are moved along the guide rail 120. The luggage box 200 is removably mounted on the mounting unit 320. Since the driving unit 340 is mounted on the luggage housing 100 and is elastically moved along the guide rail 120, the luggage box 200 may be moved together with the mounting unit 320 along the guide rail 120 by virtue of the driving unit 340.

As shown in FIGS. 3 and 4, the luggage box 200 may be provided on the front and rear surfaces thereof with mounting protrusions 220. The mounting unit 320 may extend vertically and may have a mounting groove 321, which extends longitudinally to receive the mounting protrusion 220 therein. Accordingly, the luggage box 200 may be mounted on the mounting unit 320 by inserting the mounting protrusion 220 into the mounting groove 321 in the mounting unit 320. Since the mounting groove 321 in the mounting unit 320 is configured to extend vertically, the luggage box 200 may be mounted on the mounting unit 320 by downward movement and may be separated from the mounting unit 320 by upward movement.

The mounting protrusion 220 of the luggage box 200 is positioned at the inner side of the luggage housing 100 when the luggage box 200 is inserted into the luggage housing 100. Accordingly, when the mounting unit 320 is moved into the luggage housing 100 along with the driving unit 340, the luggage box 200 may be completely inserted into the storage space S1 in the luggage housing 100.

As shown in FIGS. 4, 5, and 6, the guide rail 120 may be composed of a plurality of guide rails, which are arranged vertically. The mounting unit 320 may include a guide portion 322, which is mounted in one of the guide rails 120 and is moved therealong, and an extending portion 323 coupled to the driving unit 340 through another guide rail 120. This enables the mounting unit 320 to be reliably moved along the guide rail 120 toward the open surface 100a and to be tilted downward to be rotated together with the luggage box 200. Specifically, the guide portion 322 of the mounting unit 320 is moved along one of the guide rails 120. The extending portion 323 of the mounting unit 320 is coupled to the driving unit 340, thereby allowing the driving unit 340 to be moved along the guide rail 120 together with the mounting unit 320.

More specifically, among the plurality of guide rails 120, the uppermost guide rail 120 may be formed so as to have the maximum length. A lower guide rail 120 may have a length that is shorter than the upper adjacent guide rail 120. In other words, when the mounting unit 320 is moved along the guide rail 120 toward the open surface 100a, movement of the mounting unit 320 is restricted due to contact with the outer end of the guide rail 120. Since the lowermost guide rail 120 among the plurality of guide rails 120 has the shortest length, the lower end of the mounting unit 320 first comes into contact with the outer end of the guide rail 120. Accordingly, the lower end of the mounting unit 320 serves as the rotational center. The upper end of the mounting unit 320 is further moved along the remaining portion of the uppermost guide rail 120 and is rotated downwards.

Specifically, as shown in FIGS. 5 and 6, the guide rail 120 may include a first guide hole 121 positioned at the uppermost level, a second guide hole 122 positioned at an intermediate position, and a third guide hole 123 positioned at the lowermost level, all of which are spaced apart from one another. The guide portion 322 of the mounting unit 320 may be mounted in the second guide hole 122. The extending portion 323 may be composed of two extending portions, which are coupled to the driving unit 340, respectively, through the first guide hole 121 and the third guide hole 123.

The guide portion 322 may be rotatably mounted on the mounting unit 320 and may be provided therearound with a threaded portion 322a. The second guide hole 122, in which the guide portion 322 is mounted, may be provided with a rack rail 120a that corresponds to the threaded portion 322a, thereby enabling the guide portion 322 to be reliably moved in the state of being threaded with the rack rail 120a of the second guide hole 122.

Accordingly, when the mounting unit 320 of the guide unit 300 is moved along the guide rail 120 toward the open surface 100a, the guide portion 322 of the mounting unit 320 is moved along the second guide hole 122 while the extending portions 323, which are positioned above and under the guide portion 322, are respectively moved along the first guide hole 121 and the third guide hole 123. Since the guide portion 322 engages with the second guide hole 122 in a threaded manner, the guide portion 322 is reliably moved in the longitudinal direction of the second guide hole 122. Furthermore, since the extending portions 323 of the mounting unit 320 are coupled to the driving unit 340 respectively through the first guide hole 121 and the third guide hole 123, the driving unit 340 may be moved together with the mounting unit 320. When the mounting unit 320 is moved along the guide rail 120 toward the open surface 100a, the lowermost extending portion 323 of the mounting unit 320 comes into contact with the third guide hole 123, which has the shortest length. As a result, the mounting unit 320 is rotatable about the lower extending portion 323. Accordingly, the guide portion 322 and the upper extending portion 323 are moved further by the excess lengths of the first guide hole 121 and the second guide hole 122, which results in the mounting unit 320 being rotated.

Consequently, since the luggage box 200 mounted on the mounting unit 320 may be drawn out from the luggage housing 100 and then be tilted, the luggage box 200 may be completely taken out of the luggage housing 100.

As shown in FIGS. 4, 5, and 6, the driving unit 340 may include a movable portion 341 positioned on the outer surface of the luggage housing 100, to which the mounting unit 320 is coupled, and an elastic portion 342, which is secured to the luggage housing 100 and is connected to the movable portion 341 to provide elastic force to move the movable portion 341 toward the open surface 100a. The movable portion 341 may extend vertically so as to allow the plurality of extending portions 323 of the mounting unit 320 to be coupled thereto. Since the movable portion 341 is moved toward the open surface 100a by virtue of the elastic force of the elastic portion 341 secured to the luggage housing 100, the luggage box 200 may be moved toward the open surface 100a together with the mounting unit 320 coupled to the movable portion 341.

The elastic portion 342 may be embodied as a spiral spring secured to the luggage housing 100 adjacent to the open surface 100a. The movable portion 341, which extends vertically, may be provided with the mounting unit 320 coupled to the inner surface thereof and may be provided on the outer surface thereof with a coupling portion 341a, the spiral spring being connected to the coupling portion 341a. The elastic portion 342, which is embodied as the spiral spring, may provide the movable portion 341 with elastic force and may be embodied as any of various spring types, such as a coil spring. However, the spiral spring is applied in order to guide reliable linear movement of the movable portion 341. Because the elastic portion 342 is mounted on the outer surface of the luggage housing 100, the movable portion 341 is provided on the outer surface thereof with the coupling portion 341a such that the elastic portion 342, which is embodied as the spiral spring, is connected to the coupling portion 341a. Consequently, the movable portion 341 may be linearly moved along the guide rail 120 by virtue of the elastic force of the elastic portion 342.

The storage device according to the embodiment of the present disclosure provides the additional storage space S1 when the luggage box 200 is removed from the luggage housing 100. Hereafter, various embodiments of provision of the storage space S1 is described.

Figure 7:
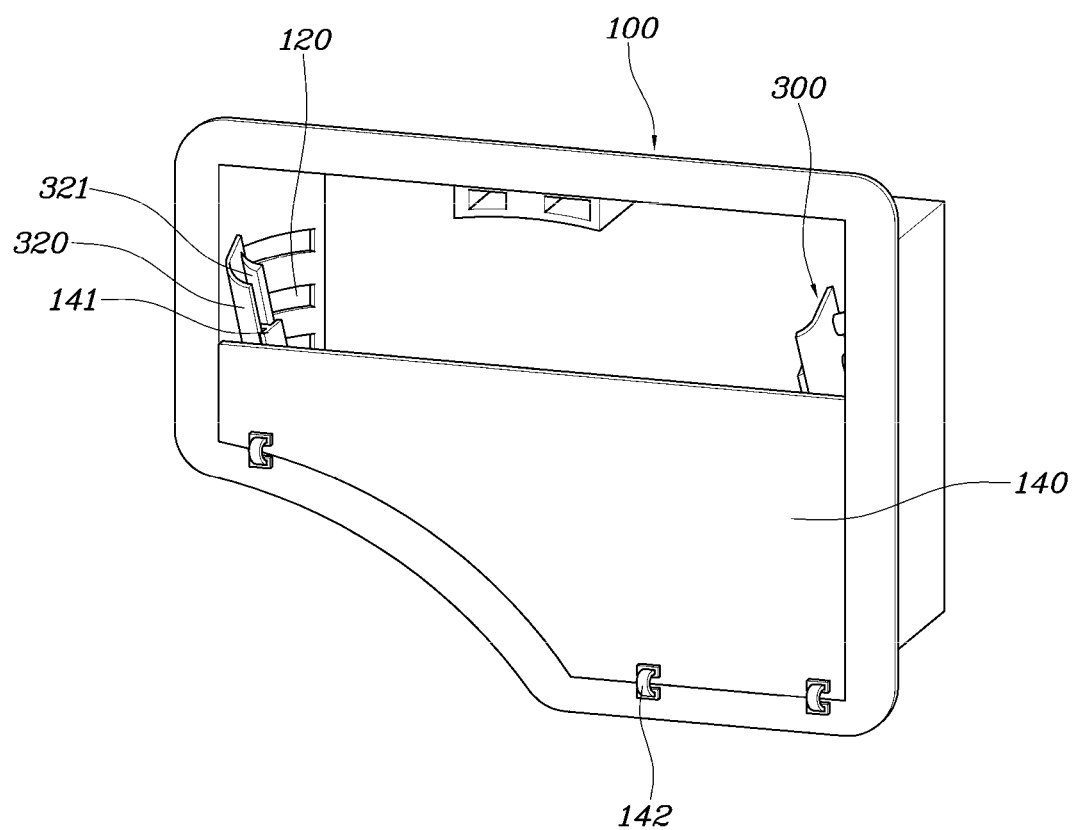

In a first embodiment of provision of the storage space S1, the luggage housing 100 may further include a detachable cover 140, which is removably mounted on the guide units 300 to shield part of the open surface 100a after the luggage box 200 is removed from the luggage housing 100, as shown in FIG. 7.

Since the storage device according to the present disclosure is constructed such that the luggage box 200 is separated from the luggage housing 100, the inside of the luggage housing 100 becomes empty after the luggage box 200 is separated from the luggage housing 100. In order to employ the empty space as the storage space S1, the detachable cover 140 is mounted to the open surface 100a to accommodate the luggage in the storage space S1 in the luggage housing 100.

The detachable cover 140 may be separately constructed and may be composed of a net or a plastic material. The detachable cover 140 may be provided at the upper end thereof with a first coupler 141, which is detachably coupled to the guide units 300, and may be provided at the lower end thereof with a second coupler 142, which is detachably coupled to the lower portion of the luggage housing 100. Consequently, the detachable cover 140 may be mounted on the open surface 100a of the luggage housing 100. The first coupler 141 may be configured to have a T-shaped section to be fitted vertically into the mounting groove 321 in the guide units 300 and may be securely coupled to the upper end of the inner surface of the detachable cover 140. The second coupler 142 may be configured to have a hook structure to be mounted to the lower portion of the luggage housing 100. A hook-coupling hole may be formed in the lower portion of the luggage housing 100 to be coupled to the second coupler 142.

Accordingly, after the luggage box 200 is removed from the luggage housing 100, the detachable cover 140 is disposed at the open surface 100a of the luggage housing 100. Subsequently, the first coupler 141 is coupled to the guide units 300, which have been moved to the open surface 100a. The second coupler 142 is coupled to the lower portion of the luggage housing 100. As a result, the detachable cover 140 is held at the open surface 100a, thereby defining the storage space S1 in the luggage housing 100.

Figure 9:
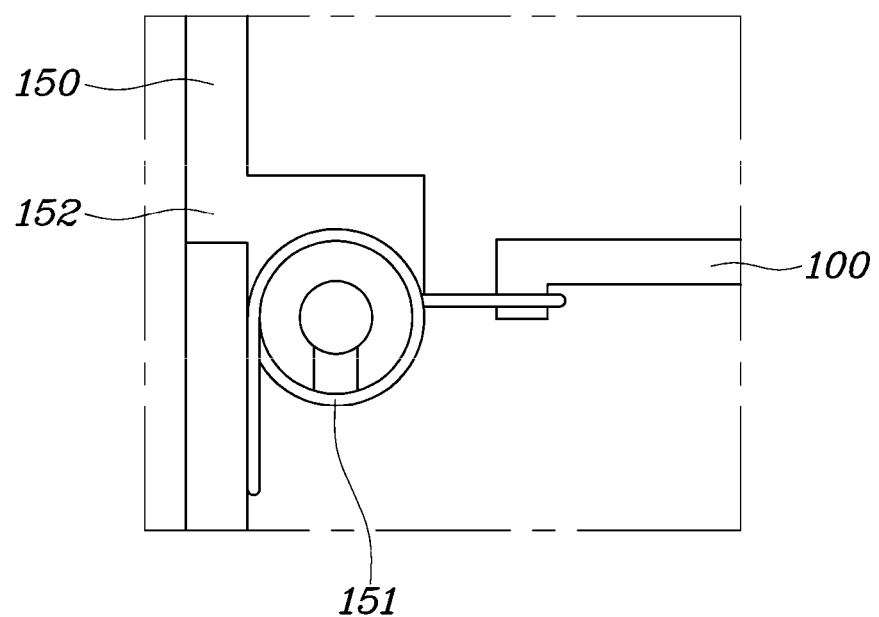

In a second embodiment, as shown in FIGS. 8 and 9, the luggage housing 100 may include a rotatable cover 150, which is positioned at the open surface 100a and is rotatably coupled to the bottom surface of the luggage housing 100 to shield part of the open surface 100a. The rotatable cover 150 may be provided at the rotational center thereof with a torsion spring 151 to provide the rotatable cover 150 with an elastic force required to close the open surface 100a.

The rotatable cover 150 is normally folded and disposed on the bottom surface of the luggage housing 100. When the luggage box 200 is removed from the luggage housing 100, the rotatable cover 150 is rotated upwards to shield part of the open surface 100a of the luggage housing 100. Since the rotational center of the rotatable cover 150 is provided with the torsion spring 151, the rotatable cover 150 is automatically rotated toward the open surface 100a by virtue of the elastic force of the torsion spring 151 when the luggage box 200 is removed from the luggage housing 100.

Furthermore, since the rotatable cover 150 may be provided at the lower end thereof, serving as the rotational center, with a stop portion 152. When the rotatable cover 150 is rotated to a predetermined angle toward the open surface 100a, the stop portion 152 comes into contact with the luggage housing 100, thereby stopping the rotational movement of the rotatable cover 150. Accordingly, when the rotatable cover 150 is rotated toward the open surface 100a, the stop portion 152 comes into contact with the luggage housing 100, thereby holding the rotatable cover 150 in the state of closing the open surface 100a.

Figure 11:
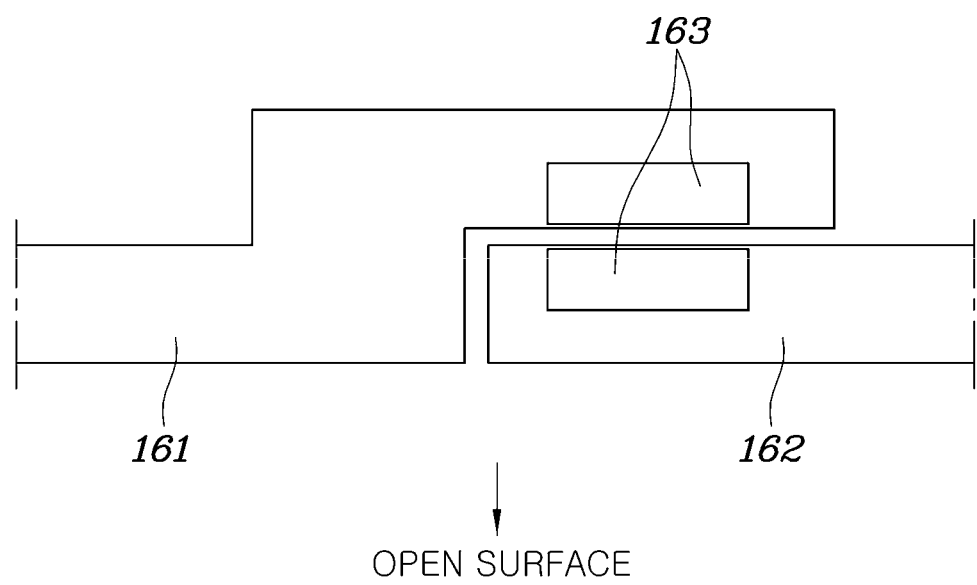

In a third embodiment, as shown in FIGS. 10 and 11, the luggage housing 100 may further include rotatable walls 160, which are respectively provided at the front and rear surfaces of the luggage housing 100 that are positioned at two lateral sides of the open surface 100a. The rotatable walls 160 may be rotatable from the front and rear surfaces toward the open surface 100a so as to shield the open surface 100a.

The rotatable walls 160 are normally folded and disposed on the front and rear surfaces of the luggage housing 100. When the luggage box 200 is removed from the luggage housing 100, the rotatable walls 160 are rotated toward the open surface 100a to shield part of the open surface 100a of the luggage housing 100. The rotatable walls 160 may also be provided with additional springs to be rotated toward the open surface 100a by virtue of elastic force of the springs, thereby improving convenience in use.

The rotatable walls 160 may include a plurality of rotatable walls, which are respectively provided at the front and rear surfaces of the luggage housing 100. Specifically, the rotatable walls 160 may include a front rotatable wall 161, the rotational center of which is positioned at the front surface of the luggage housing 100, and a rear rotatable wall 162, the rotational center of which is positioned at the rear surface of the luggage housing 100. Accordingly, when the luggage box 200 is removed, the front rotatable wall 161 and the rear rotatable wall 162 shield part of the open surface 100a of the luggage housing 100. In particular, the front rotatable wall 161 and the rear rotatable wall 162 are configured such that the ends thereof that face each other overlap each other when the front rotatable wall 161 and the rear rotatable wall 162 are unfolded toward the open surface 100a. Furthermore, the ends of the front rotatable wall 161 and the rear rotatable wall 162 that overlap each other may include magnetic members 163 embedded therein, which have different polarities. Consequently, the overlapping ends of the front rotatable wall 161 and the rear rotatable wall 162 are coupled to each other by virtue of an attracting force between the magnetic members 163, thereby stably holding the front and rear rotatable walls in the unfolded state.

Figure 12:
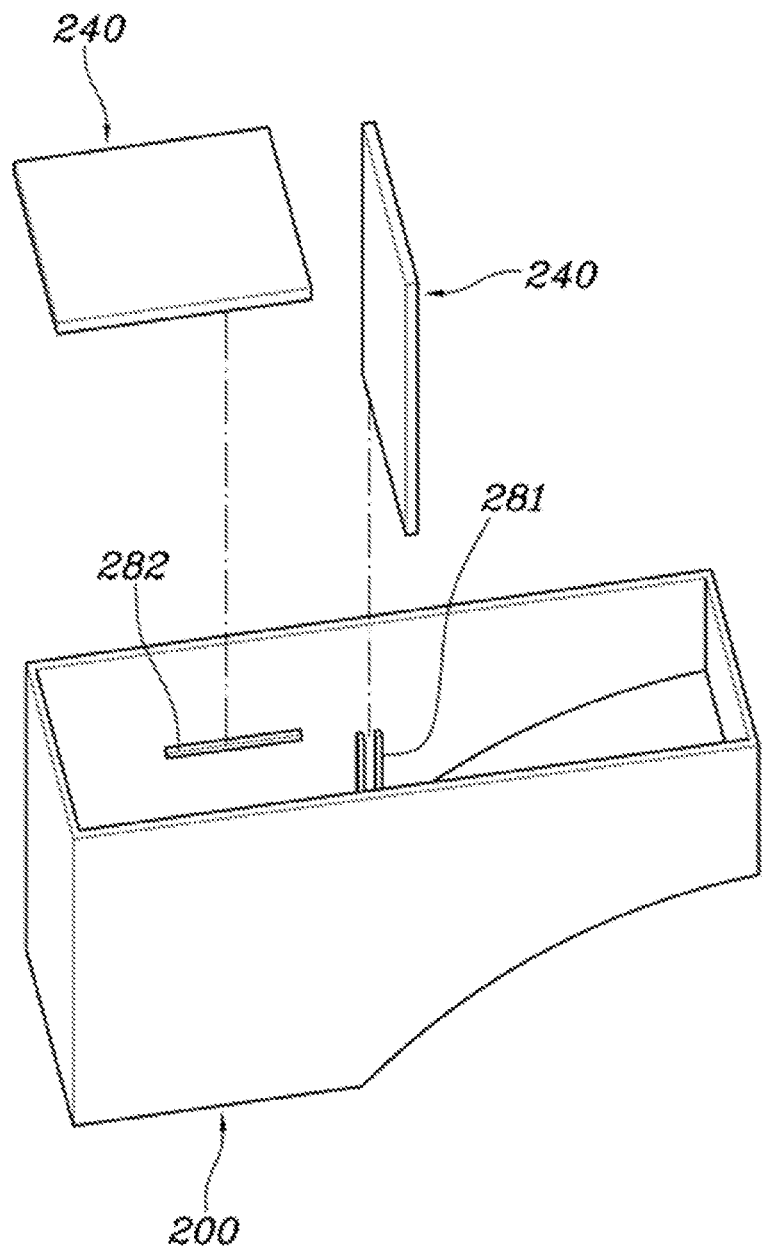

As shown in FIG. 12, the luggage box 200 may further include vertical protrusions 281 or horizontal protrusions 282, which are provided on the inner surface thereof, and a partition 240, which is supported by the vertical protrusions 281 or is placed on the horizontal protrusions 282.

As shown in FIG. 12, the luggage box 200 may be provided on the inner surface thereof with the vertical protrusions 281 and the horizontal protrusions 282. The partition 240 may be supported by the vertical protrusions 281 or the horizontal protrusions 282 to partition the storage space S2 of the luggage box 200 into multiple compartments. When the partition 240 is fitted between the vertical protrusions 281 and is held thereto, the storage space S2 in the luggage box 200 is partitioned in an anteroposterior direction. When the partition 240 is placed on the horizontal protrusions 282, the storage space S2 in the luggage box 200 is partitioned in a vertical direction. In this way, the storage space S2 in the luggage box 200 may be partitioned in various manners depending on the disposition of the partition 240, thereby accommodating luggage having various sizes in an isolated state.

Figure 13:
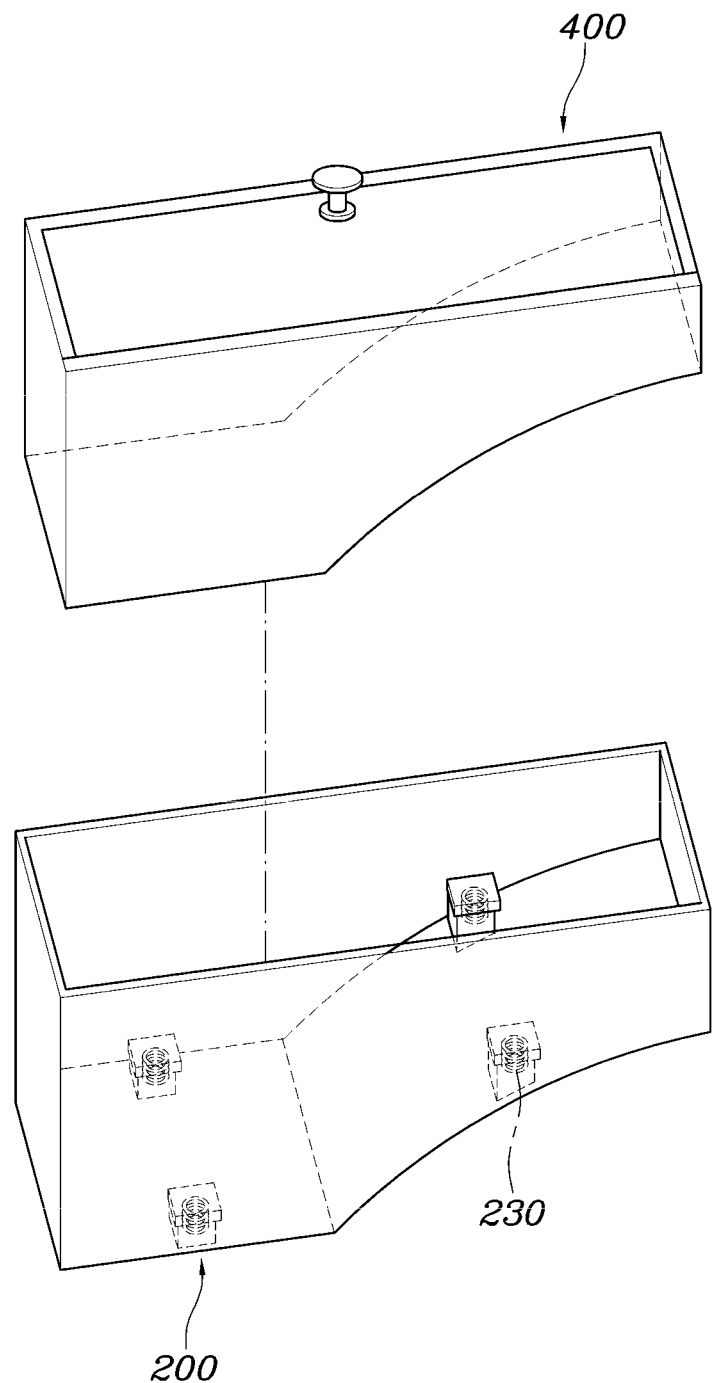

As shown in FIG. 13, the luggage box 200 may include a carrier box 400, which is removably inserted into the internal space S2 in the luggage box 200. The luggage box 200 may be provided on the inner and lower surface thereof with pushers 230, which function to resiliently support the carrier box 400 upwards by pushing manipulation thereof.

In this way, the carrier box 400 may be removably provided in the internal space S2 in the luggage box 200. Accordingly, when the carrier box 400 is inserted into the internal space S2 in the luggage box 200, the carrier box 400 provides space for accommodating luggage. When the carrier box 400 is removed from the luggage box 200, the luggage box 200 and the carrier box 400 may provide respective storage spaces for accommodating luggage.

The luggage box 200 may be provided on the lower surface thereof with the pushers 230, which resiliently support the carrier box 400 upwards by pushing manipulation thereof. Each of the pushers 230, which includes a spring therein, may be moved along a path defined by a heart-shaped cam by pushing manipulation to allow an elastic force of the spring to be selectively exerted on the pusher. When the carrier box 400 is pushed downward after the luggage box 200 is taken out of the luggage housing 100, the carrier box 400 may be lifted upwards in the luggage box 200 by virtue of the elastic force induced by the pushing manipulation. When the carrier box 400 is lifted upward in the luggage box 200 in this way, a user can more conveniently remove the carrier box 400 from the luggage box 200, thereby improving convenience in use.

As is apparent from the above description, the storage device for vehicles according to the present disclosure enables the luggage box 200 to be separated from a luggage compartment in the vehicle and to also be used outside the vehicle, thereby improving convenience in use. In addition, even when the luggage box 200 is separated from the luggage compartment, the internal space in the luggage compartment is employed as the storage space S1, thereby improving the availability of space.

Although the embodiment of the present disclosure has been described for illustrative purposes, those of ordinary skill in the art will appreciate that various modifications, additions, and substitutions are possible without departing from the scope and spirit of the disclosure as disclosed in the accompanying claims.

What is claimed is:

1. A storage device for vehicles comprising:
    a luggage housing defining a storage space at a lateral side of a luggage compartment and having an open surface;
    a luggage box removably received in the storage space in the luggage housing and having an internal space; and
    guide units provided at the luggage housing to be slid toward the open surface and then to be tilted to a predetermined angle, the luggage box being removably mounted on the guide units,
    wherein the luggage housing includes guide rails provided at a front surface and a rear surface thereof, which are positioned at two lateral sides of the open surface, and extending toward the open surface, the guide units being slidably mounted on the guide rails,
    wherein each of the guide units includes a mounting unit, which is provided at an inner surface of the luggage housing to be slid along a corresponding one of the guide rails, and a driving unit, which is provided at an outer surface of the luggage housing to be coupled to the mounting units, and
    wherein the luggage box is removably mounted on the mounting unit.

2. The storage device for vehicles according to claim 1, wherein each of the guide rails extends toward the open surface from an inside of the luggage housing and is bent downward at an outer end thereof.

3. The storage device for vehicles according to claim 1, wherein the driving unit is elastically movable toward the open surface along the corresponding one of the guide rails.

4. The storage device for vehicles according to claim 3, wherein the luggage box includes mounting protrusions provided at a front surface and a rear surface thereof, and
    wherein the mounting units extend vertically and include mounting grooves extending longitudinally, the mounting protrusions being respectively fitted into the mounting grooves.

5. The storage device for vehicles according to claim 1, wherein each of the guide rails includes a plurality of guide rails, which are arranged parallelly, and
    wherein each of the mounting units includes a guide portion, which is mounted on one guide rail of the guide rails and is moved therealong, and an extending portion coupled to the driving unit through another guide rail of the guide rails.

6. The storage device for vehicles according to claim 5, wherein the guide rails include a first guide hole positioned at an uppermost level, a second guide hole positioned at an intermediate level, and a third guide hole positioned at a lowermost level, all of which are spaced apart from one another,
   wherein the guide portion of the mounting unit is mounted in the second guide hole, and
   wherein the extending portion includes a plurality of extending portions, which are coupled to the driving unit respectively through the first guide hole and the third guide hole.

7. The storage device for vehicles according to claim 5, wherein the guide portion is rotatably mounted on the mounting unit and has a threaded portion therearound, and
   wherein the one guide rail of the guide rails on which the guide portion is mounted includes a threaded portion, which corresponds to the threaded portion of the guide portion.

8. The storage device for vehicles according to claim 3, wherein the driving unit includes a movable portion positioned on an outer surface of the luggage housing, to which the mounting unit is coupled, and an elastic portion, which is secured to the luggage housing and is connected to the movable portion to provide an elastic force to move the movable portion toward the open surface.

9. The storage device for vehicles according to claim 8, wherein the elastic portion is a spiral spring secured to the luggage housing adjacent to the open surface, and
   wherein the movable portion, which extends vertically, is provided with the mounting unit, which is coupled to an inner surface of the luggage housing and is provided on an outer surface of the luggage housing with a coupling portion, the spiral spring connected to the coupling portion.

10. The storage device for vehicles according to claim 1, wherein the luggage housing further includes a detachable cover, which is removably mounted on one of the guide units to shield part of the open surface after the luggage box is removed from the luggage housing.

11. The storage device for vehicles according to claim 10, wherein the detachable cover is provided at an upper end thereof with a first coupler, which is detachably coupled to one of the guide units and is provided at a lower end thereof with a second coupler, which is detachably coupled to a lower portion of the luggage housing.

12. The storage device for vehicles according to claim 1, further comprising a carrier box, which is removably inserted into the internal space in the luggage box,
   wherein the luggage box is provided on an inner and lower surface thereof with a pusher, which functions to resiliently support the carrier box upwards by a pushing manipulation thereof.

13. The storage device for vehicles according to claim 1, wherein the luggage box further includes vertical protrusions or horizontal protrusions provided on an inner surface thereof, and a partition, which is supported by the vertical protrusions or is placed on the horizontal protrusions.

* * * * *